United States Patent [19]

Day

[11] Patent Number: 5,095,949
[45] Date of Patent: Mar. 17, 1992

[54] PLASTIC VALVE BUSH FOR DYNAMIC MULTI-PORT VALVE

[75] Inventor: John Day, Aldershot, England

[73] Assignee: Norgren Martonair Limited, Great Britain

[21] Appl. No.: 656,872

[22] Filed: Feb. 19, 1991

[30] Foreign Application Priority Data

Feb. 17, 1990 [GB] United Kingdom ................ 9003673

[51] Int. Cl.$^5$ .............................................. F16K 11/07
[52] U.S. Cl. ............................ 137/625.69; 137/625.48
[58] Field of Search ................... 137/625.69, 625.68, 137/625.67, 625.48

[56] References Cited

U.S. PATENT DOCUMENTS

| | | | |
|---|---|---|---|
| 1,307,821 | 6/1919 | Kiesel | 137/625.69 |
| 1,839,581 | 1/1932 | Nell | 137/625.69 |
| 2,920,650 | 1/1960 | Moog | 137/625.69 |
| 3,103,739 | 9/1963 | Moog . | |
| 3,199,540 | 8/1965 | Forster | 137/625.69 |
| 3,451,430 | 10/1966 | Cowdin . | |
| 3,552,442 | 1/1971 | Knowles | 137/625.69 |
| 3,690,874 | 9/1972 | Tarshis . | |
| 4,680,596 | 8/1972 | Pickett | 137/625.69 |

FOREIGN PATENT DOCUMENTS

| | | |
|---|---|---|
| 0305252 | 8/1988 | European Pat. Off. . |
| 1550033 | 9/1969 | Fed. Rep. of Germany ......................... 137/625.69 |
| 2160467 | 7/1972 | Fed. Rep. of Germany . |
| 3043871 | 7/1982 | Fed. Rep. of Germany . |

Primary Examiner—Alan Cohan
Attorney, Agent, or Firm—Cushman, Darby & Cushman

[57] ABSTRACT

A valve bush for a dynamic multi-port valve comprises a plurality of separately formed hollow cylindrical plastics segments interengaged in end-to-end relationship to form the bush, the or each intermediate set of small diameter apertures being in the form of a plurality of apertures, for example rectangular slots, defined by facing end surfaces of two adjacent segments and by a plurality of spaced fingers extending axially from said end surfaces. A bush of the invention for a five port valve will comprise three such segments, and a bush for a three port valve will comprise two such segments.

7 Claims, 3 Drawing Sheets

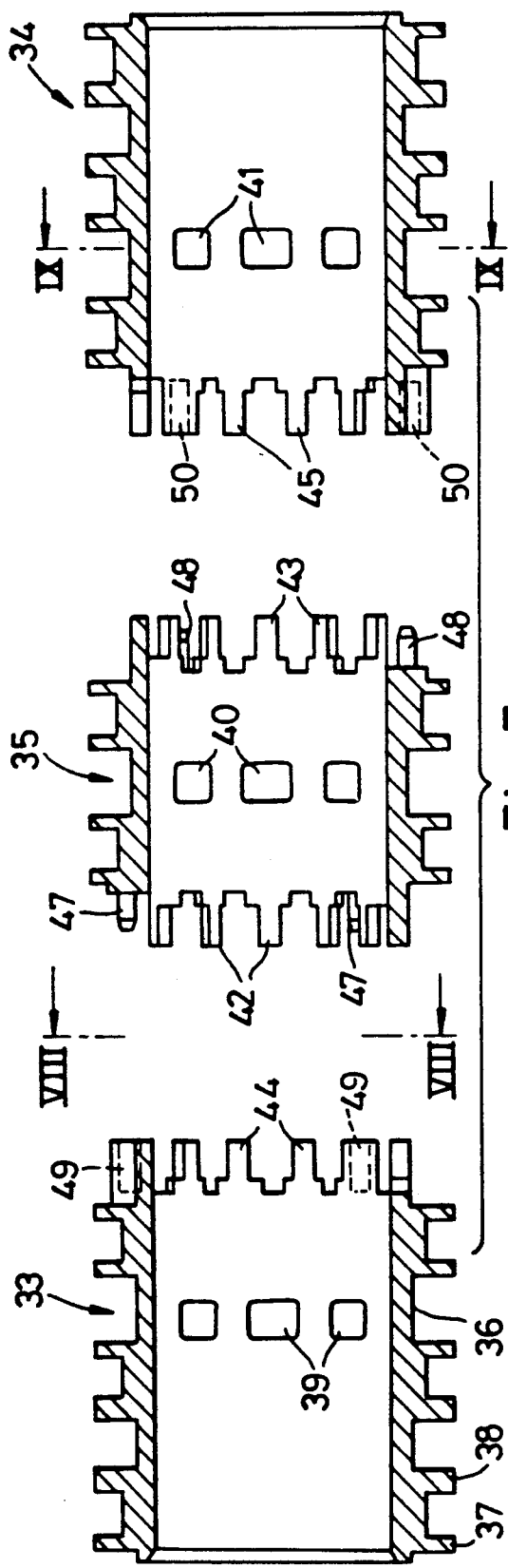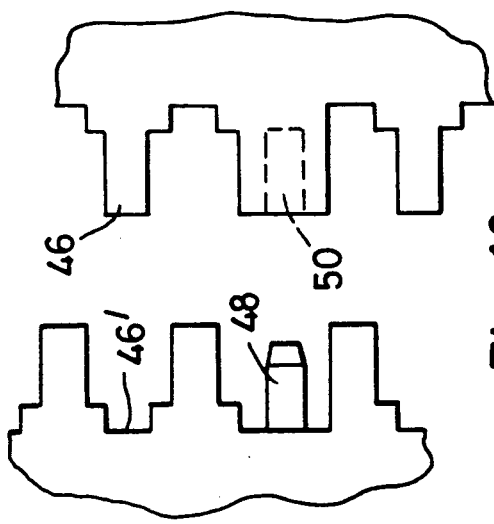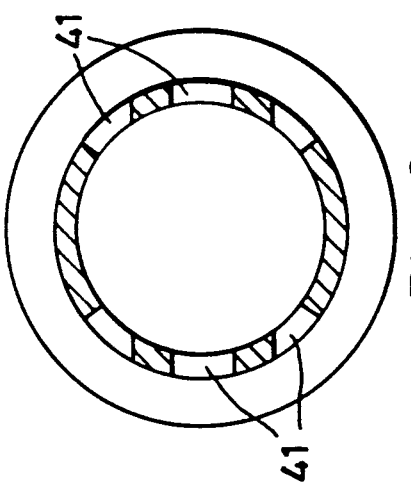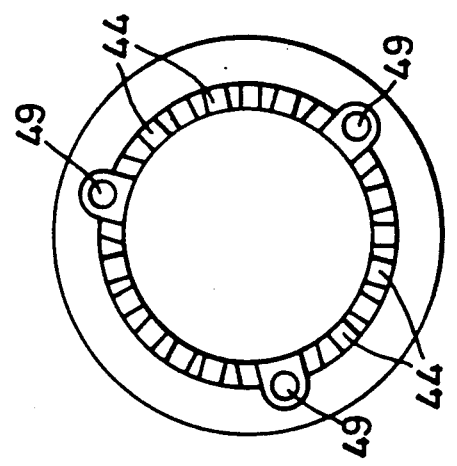

10

PLASTIC VALVE BUSH FOR DYNAMIC MULTI-PORT VALVE

BACKGROUND OF THE INVENTION

This invention relates to valve bushes and has particular reference to valve bushes for dynamic multi-port valves, for example three or five port valves.

THE PRIOR ART

In a dynamic five port valve there is an outer hollow cylindrical member through which extend five ports for the ingress and egress of fluid, normally compressed air. Within the cylindrical member there is a hollow, generally cylindrical valve bush which includes five axially spaced sets of circumferential apertures and a series of lands to locate a series of 'o'-rings. The two end sets, and the central set, of apertures are of relatively large diameter whereas the two intermediate sets of apertures are of very small diameter. On the outside of the bush the lands define locations for six 'o'-rings which separate the sets of apertures from one other and from the ends of the bush. Additionally it is convenient to provide a further pair of lands for locating end 'o'-rings that serve to seal the valve bush in a valve body.

Within the valve bush there is located a piston which includes sets of 'o'-rings and annular relieved portions. The piston is axially moveable within the bush so as to make the desired connections between the valve ports. In such a dynamic seal valve, certain of the 'o' rings on the inner piston have to traverse the two intermediate sets of small diameter apertures. For a practical dynamic valve in which the 'o'-ring seal has a sufficient life to be commerically useful, the 'o'-rings must be supported properly during their movement and it is for this reason that the two intermediate sets of apertures are of very small diameter, so that the ligaments between the apertures can support the 'o'-rings during their traverse across the apertures. It has been the practice, hitherto, to form the valve bush from brass and to drill the small diameter apertures individually with a fine drill.

Such brass bushes work very well but are expensive to manufacture because of the need to drill the holes individually.

Dynamic three port valves are, in principle, identical but of course utilize a bush having correspondingly few sets of large and small diameter apertures and O-ring lands. Hereinafter such a bush for a dynamic multi-port valve is referred to as a multi-port valve bush of the type set forth.

SUMMARY OF THE INVENTION

By the present invention there is provided a multi-port valve bush of the type set forth, characterized in that the bush is formed of plastics material, in a plurality of hollow cylindrical segments interengaged in end-to-end relationship to form the bush, the or each intermediate set of small diameter apertures being in the form of a plurality of apertures, for example rectangular slots, defined by facing end surfaces of two adjacent segments and by a plurality of spaced fingers extending axially from said end surfaces.

The fingers of one segment preferably intermesh, in spaced parallel relationship, with fingers of the adjacent segment and may lock into respective recesses formed in the facing end surface of, and between the fingers of, the adjacent segment. Alternatively, for example, the respective ends of the fingers of one segment may simply abut the respective ends of corresponding fingers of the adjacent segment.

Adjacent segments may be interengaged by pips and recesses moulded integrally on said segments. The pips may, for example, be a snap fit in their respective recesses or may be secured therein by an adhesive or weld.

The segments, of which there will, for example, be two in a three port valve and three in a five port valve, may be formed by injection moulding.

The present invention also provides a dynamic seal multi-port valve in which the valve bush is as is set out above. The valve may be operated pneumatically or mechanically, for example by means of springs or levers, as is conventional.

DESCRIPTION OF THE DRAWINGS

The invention will now be described in more detail, by way of example, with reference to the accompanying drawings of which:

FIG. 7 is an exploded, sectional view of a bush of the invention comprising three segments, FIG. 8 is a view of FIG. 7 along the line VIII—VIII, FIG. 9 is a section of FIG. 7 on the line IX—IX, and FIG. 10 is an enlarged exploded detail of the junction between adjacent segments of FIG. 7.

Referring to FIG. 1, this shows a dynamic seal five port valve essentially comprising an outer casing 1 secured to a base member 2 by screws, not shown. A series of air passages such as passage 3 extends through the base member 2 and through one wall of the outer casing 1. Located within the casing 1 is a fixed valve bush 4 and located within the valve bush 4 is an axially moveable piston 5 having three annular recesses 5', 5", 5"' formed on its external surface. It can be seen that the piston 5 carries with it a series of 'o'-rings located on lands 6,7,8 and 9 which serve to isolate the recesses 5', 5", 5"' from one another. The valve bush 4 has a series of apertures along the axial length of the bush and supports a series of 'o'-rings 14,15,16,17,18 and 19, which together with the casing 1 define a series of annular chambers in communication with the ports 3, 10, 11, 12 and 13. The desired interconnection between these ports thus occurs via the internal piston. With the piston shown in the position in FIG. 1, ports 10 and 11 are interconnected, as are ports 3 and 12, but port 13 is blanked off. However, by moving the piston to the right, ports 12 and 13 are connected, as are ports 3 and 11 and port 10 is blanked off. Outer 'o'-rings 20 and 21 seal the bush in the casing. As can be seen in FIG. 3 the ports 3,10,11,12 and 13 are staggered within the base 2. The piston is moved by air pressure, supplied to either end via ports 22,23.

Figure 1:
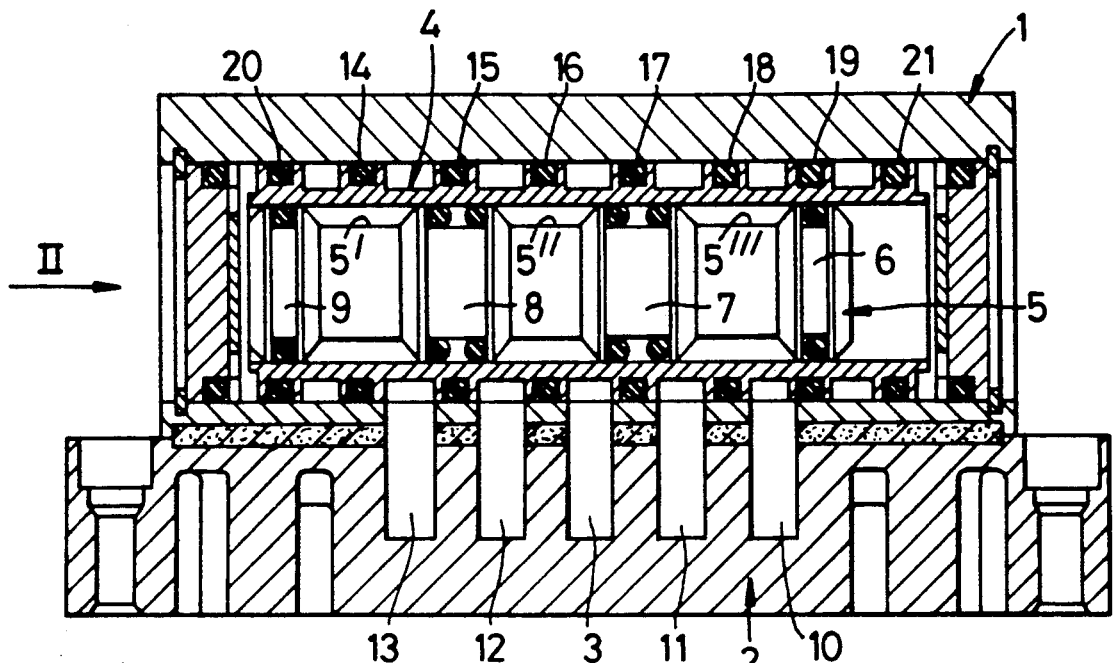
FIG. 1 is a cross section through a dynamic seal five port valve.
Figure 2:
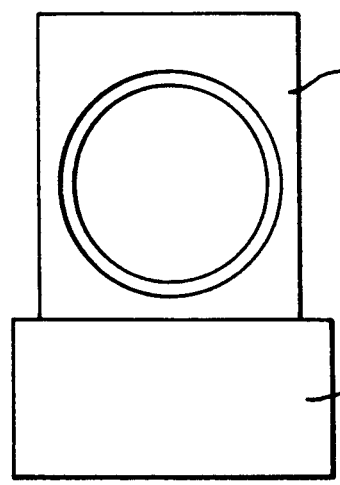
FIG. 2 is an end view of FIG. 1 along the line of arrow II.
Figure 3:
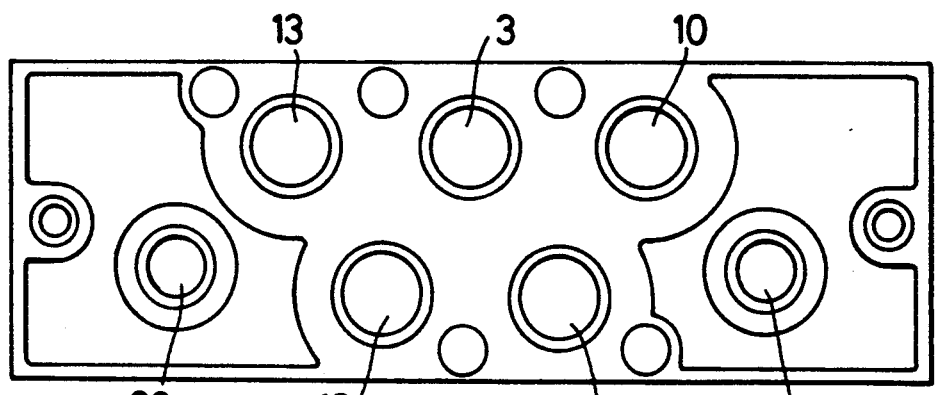
FIG. 3 is a part section of FIG. 1 through the base of the valve of FIG. 1.
Figure 4:
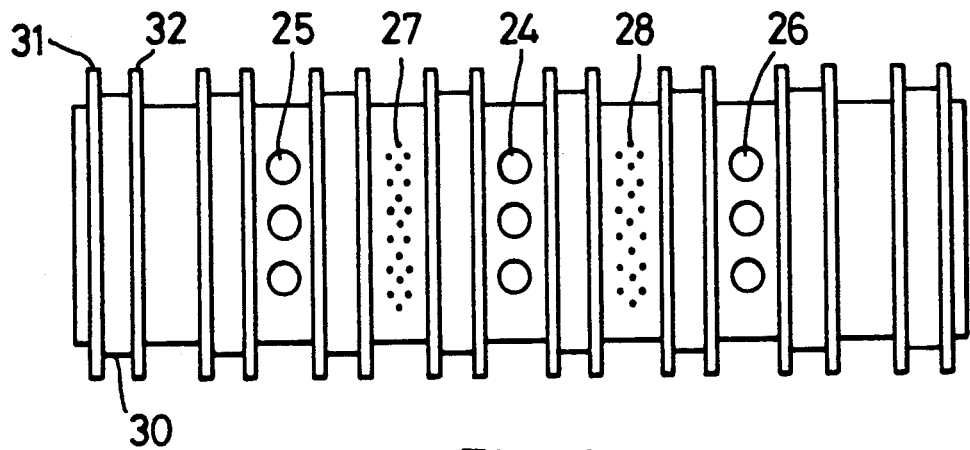
FIG. 4 is an external view of a prior art brass bush.
Figure 5:
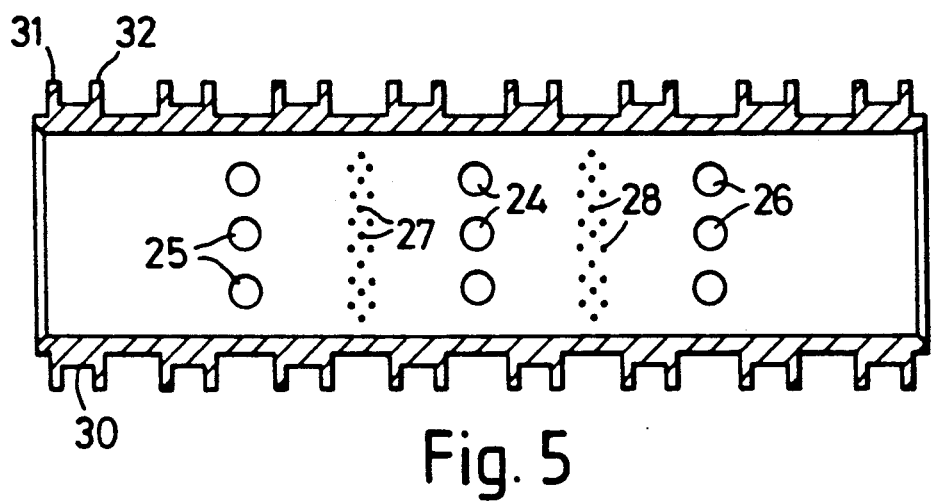
FIG. 5 is a cross section of FIG. 4.
Figure 6:
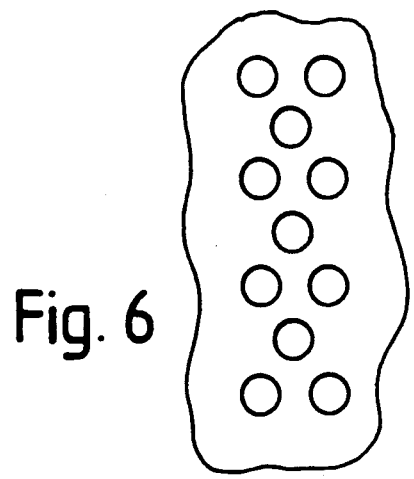
FIG. 6 is an enlarged detail of the holes of FIG. 4.

Such a dynamic seal five port valve is well known and conventionally incorporates a brass bush 4, as illustrated in FIG. 4 to 6. The brass bush is in the form of a hollow cylinder with a central set of large diameter apertures (or "ports"), 24, and two outer sets of apertures 25, 26 spaced axially from the central set of apertures. Located between the three sets of large diameter apertures are two intermediate sets of small diameter holes shown at 27,28. These holes are shown in an enlarged view in FIG. 6. The holes are individually drilled and in the case of a ⅛" diameter bush there may be, for example, as many as 480 such holes. As the holes are drilled through from the outside they have to be deburred on the inside, otherwise the 'o'-rings mounted on the lands 7 and 8 of the piston 5 would become damaged during movement of the piston. Further, if the holes 27, 28 were of a large diameter the 'o'-rings would be extruded into them and rapidly become damaged.

Such existing brass bushes are extremely reliable but are expensive to manufacture. Thus not only do they have to be drilled with a very large number of holes, but also they have to be machined to produce the lands (such as land 30 with its associated annular flanges 31,32) which locate the 'o'-rings—in the case of land 30, 'o'-ring 20.

In a valve bush according to the invention, as illustrated in FIGS. 7 to 10, the entire bush is of injection moulded plastics material. A typical plastics material would be ABS.

The valve bush comprises three separately moulded segments, namely segments 33,34 and 35. It can be seen that segments 33 and 34 are identical and, therefore, only two moulds are required to produce the bush. As will be appreciated, the lands, such as land 36 and associated flanges 37,38 are integrally moulded and the large diameter apertures 39,40,41 would be formed by pins forming part of the mould tool. These apertures 39,40 and 41 correspond to ports 25,24,26 of the brass bush described above with reference to FIGS. 4 to 6.

The central segment 35 has a plurality of integrally moulded, axially extending, spaced fingers 42,43 on each end which intermesh, in spaced parallel relationship with like fingers 44,45 formed on the adjacent end segments 33,34. The tips 46 of the fingers engage in respective recesses 46' formed in the end face of the adjacent segment, as shown in FIG. 10.

Upon assembly of the segments 33,34 and 35, therefore, the fingers of one segment intermesh, in spaced relationship, with the fingers of the adjacent segment and, together with the facing end surfaces of the segments, define two intermediate sets of a plurality of small apertures (corresponding with apertures 27 and 28 of the brass bush shown in FIGS. 4 to 6) each in the form of a rectangular slot. By way of example, each slot may be about 2 mm long and 1 mm wide.

Additionally the central segment 35 is provided with integral pips 47,48 which engage integral recesses 49,50 formed in the end segments 33,34 thereby locking the segments together.

The corners of the components over which the piston 'o'-rings slide are radiussed to prevent chaffing of the 'o'-rings.

It will therefore be seen that the invention affords a valve bush that can readily be assembled from relatively simple mouldings, whereby the complex and expensive drilling and machining operations associated with the prior brass bushes is avoided.

As noted earlier, appropriate plastics bushes may likewise be produced for use in other multi-port dynamic valves, for example 3-port valves.

I claim:

1. A hollow, generally cylindrical bush for use in a dynamic multi-port spool valve, said bush having at least two axially spaced sets of relatively large diameter apertures formed cirfumferentially therearound, and extending therethrough, and intermediate adjacent said sets of relatively large diameter apertures, a set of relatively small diameter apertures formed circumferentially therearound and extending therethrough, the improvement wherein the bush comprises an assembly of a plurality of separately formed, plastic, hollow cylindrical segments arranged in end-to-end relationship, each set of relatively small diameter apertures being defined by facing end surfaces of two adjacent segments and by a plurality of fingers extending axially from said facing end surfaces, the fingers of one segment intermeshing, in spaced parallel relationship, with the fingers of the adjacent segment.

2. A bush according to claim 1 wherein the fingers of one segment lock into respective recesses formed in the facing end surface of, and between the fingers of, the adjacent segment.

3. A bush according to claim 1 wherein adjacent segments are interengaged by pips and recesses moulded integrally on said segments.

4. A bush according to claim 1 comprising two such segments for use in a dynamic three port valve.

5. A bush according to claim 1 comprising three such segments for use in a dynamic five port valve.

6. A bush according to claim 1 wherein said apertures are in the form of rectangular slots.

7. A dynamic multi-port valve comprising a valve bush according to claim 1.

* * * * *